United States Patent [19]

Hügler

[11] Patent Number: 4,561,632

[45] Date of Patent: Dec. 31, 1985

[54] SOLENOID VALVE

[75] Inventor: Klaus Hügler, Schorndorf, Fed. Rep. of Germany

[73] Assignee: J. Lorch Gesellschaft & Co. KG, Waldenbuch, Fed. Rep. of Germany

[21] Appl. No.: 652,615

[22] Filed: Sep. 20, 1984

[30] Foreign Application Priority Data

Sep. 21, 1983 [DE] Fed. Rep. of Germany ....... 3334159

[51] Int. Cl.⁴ ............................................. F16K 31/07
[52] U.S. Cl. .................................. 251/129.15; 251/65; 251/129.20; 137/625.44; 335/234
[58] Field of Search ................. 251/141, 65, 129, 137, 251/138; 335/78, 79, 234; 137/625.44

[56] References Cited

U.S. PATENT DOCUMENTS

| | | | |
|---|---|---|---|
| 2,160,117 | 5/1939 | Borresen | 251/129 |
| 3,399,861 | 9/1968 | Howland | 251/129 |
| 3,532,121 | 10/1970 | Sturman et al. | 251/129 |
| 4,285,497 | 8/1981 | Göttel | 251/138 |
| 4,310,143 | 1/1982 | Determan | 251/141 |
| 4,343,329 | 8/1982 | Turansky et al. | 137/625.44 |
| 4,397,443 | 8/1983 | Watanabe et al. | 251/129 |

FOREIGN PATENT DOCUMENTS 751255 1/1967 Canada ................................. 251/65

Primary Examiner—Samuel Scott
Assistant Examiner—Noah Kamen
Attorney, Agent, or Firm—Hopgood, Calimafde, Kalil, Blaustein & Judlowe

[57] ABSTRACT

A solenoid valve for liquid and gaseous media whose valve closure piece or pieces (24) can be actuated by an armature (20') which is movable relative to the valve seat or seats (18, 19) is disclosed. The armature lies in the magnetic field of at least one electromagnet (4, 5) and of at least one permanent magnet (10) arranged outside the field of the electromagnet. The valve is closed via the armature (20') and has operating air gaps which change in opposite directions upon a movement of the armature. The electromagnet is provided with a core (4) whose ends form three magnet poles (10, 11, 12). The armature (20') which contains the permanent magnet (21) has two pole pieces (20') which extend between the three magnet poles (10, 11, 12) of the electromagnet to form four operating air gaps, the pole pieces being combined with the permanent magnet and connected with them to form as assembly.

17 Claims, 3 Drawing Figures

SOLENOID VALVE

The present invention relates to solenoid valves for liquid and gaseous fluids wherein the valve member or members can be actuated by means of an armature which is movable relative to the valve seat or seats and is located in the magnetic field of an electromagnet. This type of system generally also has a permanent magnet which is arranged outside of the magnetic field of the electromagnet.

BACKGROUND OF THE INVENTION

In one known solenoid valve, the space required and the electric power necessary for switching are relatively slight. This solenoid valve is, however, very expensive. Further reduction in the space required and the cost of such a valve have been limited by the fact that both the magnetic field of the electromagnet and the magnetic field of the permanent magnet must be developed asymmetrically since the magnetic flux of the permanent magnet must be conducted along an additional flux conducting element which is disposed on one arm of the U-shaped core of the electromagnet in order to mesh with the flux of the electromagnet. Furthermore, the U shape of the core of the electromagnet makes division thereof necessary if the exciter winding is to be inserted as a ready-wound coil.

Furthermore, in known solenoid valves there are structural difficulties in protecting the armature from contact with the fluid to be controlled by the solenoid valve, and the inert mass of the armature and its bearing friction are commonly relatively great.

An object of the present invention is to create a solenoid valve which, while taking up less space, can be made at lower cost. It is a further object of the invention to make it possible, without difficulty, to separate the armature from the fluid to be controlled.

SUMMARY OF THE INVENTION

The objects of the invention are achieved by providing a solenoid valve for fluids wherein the valve member or members are actuated by an armature which is movable with respect to the valve seat. The inventive armature has a permanent magnet and two extended portions of magnetic flux conducting material. The solenoid valve further includes an electromagnet having three distinct magnetic parts associated therewith. The armature is pivotally mounted so that the two extended portions thereof are in a facing relationship to the respective magnet parts associated with the electromagnet. By appropriate electrical manipulation of the electromagnet, magnetic part attracts one of the extended portions of the armature, opening or closing one of the valves.

The three-pole form of the core of the electromagnet makes it possible to dispense with the dividing of the core even if a ready-wound coil is to be used, so that the core can have a laminated structure. In particular, this form of core makes it possible to develop the magnetic "circuit" of the permanent magnet system without additional flux guide pieces and without having to arrange the permanent magnet outside of the magnetic circuit of the electromagnet which is closed via the armature. Since the sum of the operating air-gap sizes is constant in each position of the armature, there is also a minimal space requirement and a minimal electrical power requirement. There contributes to the latter a stray flux which is less than in known devices. As a result, neither additional flux guide pieces and/or low-inertia forms of the armature are required. The special arrangement of the air gaps and pole pieces makes it possible to place the armature pivot point at a place which is optimum from the standpoint of the valve construction and sealing without producing additional ancillary air gaps or other electromagnetically required features. This, as well as the inclusion of the permanent magnet in the assembly forming the armature, makes it possible to protect the armature in a structurally simple manner from admission of the fluid to be controlled. The assembly can, for instance, be provided on a swivel arm which passes through a seal and has its pivot point centrally in the region of least deformation of the seal.

In one embodiment, the permanent magnet, which might also consist of a system of two or more permanent magnets, is arranged between two pole-shoe bodies which lie against it on opposite surfaces and parts of the pole shoe bodies extend beyond the permanent magnet to form one or the other part of the armature. In this way there is obtained a particularly simple, compact and construction development of the assembly.

To be sure, it is also possible to guide the assembly by axial motion within the valve housing. However, it is simpler to mount the armature for rotation around an axis in the valve housing, the axis preferably lying in the plane of symmetry both of the assembly and of the core of the electromagnet; that is, perpendicular to the plane of cross section in the drawings.

In order to be able to adjust the electromagnet system in a particularly simple manner, which makes it possible to keep the manufacturing tolerances greater than without the possibility of such adjustment, a threaded passage borehole extending into the adjoining operating air gap can be provided in at least one of the two outer magnet poles of the electromagnet. An adjustment screw of magnetizable material is arranged and said borehole to adjust the effective width of the gap. By greater or lesser penetration of this adjustment screw into the operating air gap the effective size of the gap can be changed and thus be adapted accurately, for instance, to the effective size of the operating air gap adjoining the other outer magnet pole.

Another important advantage of the construction of the solenoid valve in accordance with the invention is that it is possible, without structural difficulties, to have spring forces which act in a direction of movement of the assembly but are directed against each other, act on the armature assembly. As a result, the characteristic force necessary for actuation of the armature can be adjusted without necessarily loading the armature mounting. Accordingly, the solenoid valve of the invention can be imparted not only a monostable behavior but also a bistable or tristable behavior. It should also be noted that the inventive valve can be developed as a proportional valve in which the deflection of the armature is proportional to the control signal.

The spring force can be applied by a torsion bar at the axis of rotation. As a rule, however, it will be more advantageous to provide two coil springs which rest at the one end against the part of the valve housing containing the assembly and on the other end against opposite sides of the assembly. In such case the initial tension of the spring can then be easily adjusted, for instance, by means of a set screw against which the end of the spring facing away from the assembly can rest.

Such springs can also be used to reduce the force which must be applied on the armature in order to rotate the armature in opposition to the holding force produced by the permanent-magnet system, whereby the electric control power can be considerably reduced. If only severing force is to be reduced, then the spring arrangement can also be of such a nature that the springs or pressing elements actuated by them penetrate only to a limited extent into the operating air gap, so that, after rotation, the armature comes free from the spring which helps break it loose.

If the valve boreholes extend into the space containing the assembly, then it is probably advantageous, for considerations of both space and cost, to arrange each valve closure piece on a supporting part which protrudes laterally from the assembly. For cost reasons it is particularly advantageous to develop the supporting parts on a plastic body which surrounds the permanent magnet and the sections of the pole shoe body resting against it.

The valve closure pieces held by the supporting parts can be acted on by individual springs which press them against the associated valve seat. Additional space is not necessary for such springs if—as in the case of a preferred embodiment of the invention—the valve closure pieces are aligned with the two outer poles of the electromagnet, since in such case coil springs can be provided which rest at one end against the associated valve closure piece and engage at the other end into a borehole in the magnet pole which is aligned with said valve closure piece.

If the fluid to be controlled is not to come into contact with the armature and the other parts of the assembly or the magnet poles of the electromagnet, then the assembly need form only a first arm of a double-arm swivel lever whose second arm extends into a space from which the space containing the assembly is protected by a seal against the admission of the fluid. In this connection, the arm can be passed through its seal and be supported directly alongside the seal so that the flexing work to which the seal is subjected as well as the force necessary for the movement of the armature can be reduced to a minimum. This construction has the advantages that: (1) the permanent-magnet system exerts a minimum attractive force on the mounting of the assembly, which is true whether or not the assembly forms one arm of a double-armed lever; (2) it forms a seal between the armature and the rocker lever.

The valve closure pieces present in the second space are preferably developed as a single piece with a resilient plastic body which surrounds the arm and which, in turn, is preferably developed in one piece with the seal. The fluid cannot penetrate between the plastic body or the seal, or between the arm and the seal. In order to be able to equalize stroke tolerances it is advisable to make the arm resilient, for instance to develop it as a leaf spring.

Of course, the arrangement can also be such that the assembly remains at rest while the core moves. As a rule, however, due to the substantially lower mass to which the construction of the assembly in accordance with the invention contributes, the latter will be the moving part. The closure pieces need not be adapted to rest directly against the valve seat. They can, in their turn, also actuate valve disks, valve balls, valve pistons, or the like.

BRIEF DESCRIPTION OF DRAWINGS

The invention will be described below in detail with reference to the drawings, which illustrate only specific embodiments, in which:

FIG. 1a is a cross sectional view of FIG. 1 taken through line 1a—1a; and

DETAILED DESCRIPTION

Figure 1:
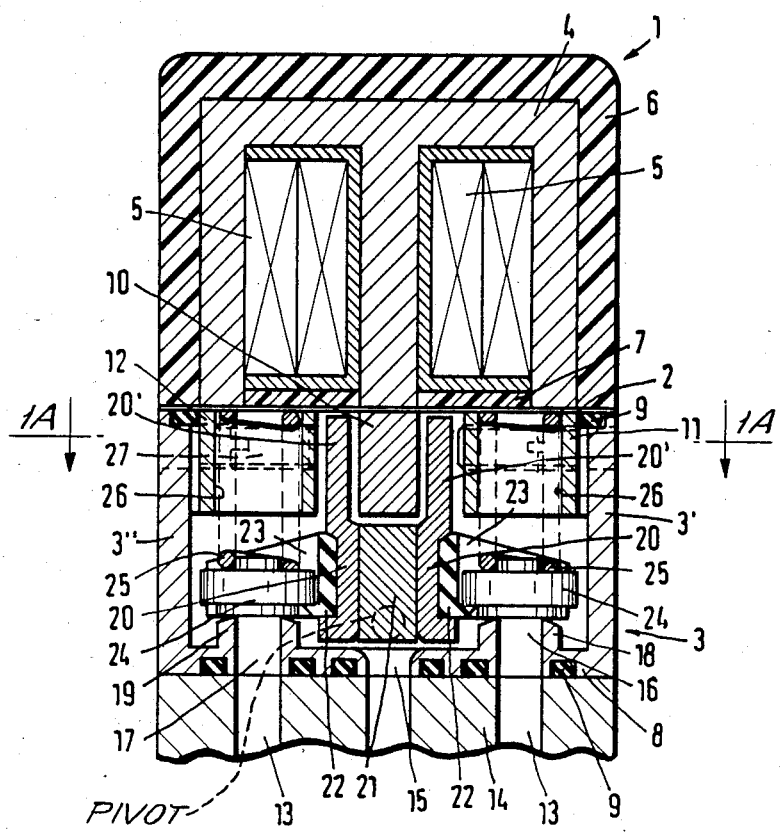
FIG. 1 is a longitudinal section through a first embodiment.
Figure 1A:
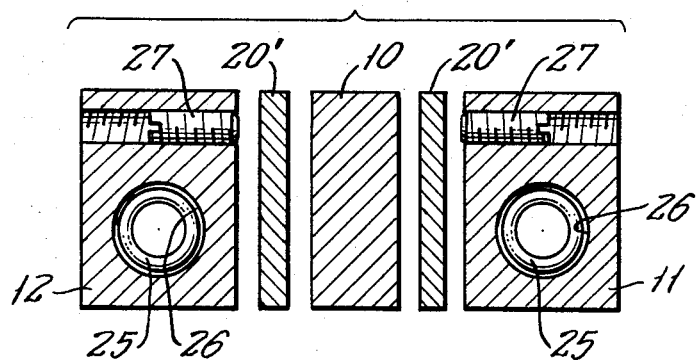

The solenoid valve shown in FIG. 1 has a magnet head 1 one side of which rests, with the interposition of a separating foil 2, against a valve housing 3 which is formed of two valve-housing halves 3' and 3". Screws (not shown) connect the two valve-housing halves as well as the valve housing to the magnet head, which is protected by the separating foil 2 from admission of the fluid controlled by the solenoid valve.

The magnet head contains a laminated E-shaped core 4 in which there are placed two axially arranged toroidal coils 5 which are wound outside core 4. The electromagnet could, however, also have only a single exciter coil. The core 4 is contained within a plastic housing 6 which leaves free only the ends of the two outer arms of the core 4 and the end of its central arm, all of which lie against the separating foil 2. The space between these arms and the separating foil and the space between these arms and the exciter coils 5 is filled with an insulating compound 7. The plastic housing 6 and the insulating compound 7 could be formed from a single block of molding compound.

The valve housing 3 has the shape of a pot which is open towards the separating foil 2 and is closed off on the outside, flush with the plastic housing 6. A seal 9 is provided to assure the tight closing of the open side by the separating foil 2.

In order to form three magnet poles 10, 11 and 12 of the electromagnet within the valve housing 3, three solid strips of a readily magnetizable material are fixed in the valve housing 3 on the wall thereof such that one side lies with its full surface against the separating surface 2. The strip which forms the central magnet pole 10 has a rectangular cross section. As shown in FIG. 1, it is adapted to the dimensions of the central leg of the core 4 and forms an extension of equal cross section of the central leg. In the same way, the strips forming the two outer magnet poles 11 and 12, which are also solid and consist of a readily magnetizable material, increase the length of the two outer legs. These strips also are of rectangular cross section so that, while they terminate flush on the outside with the associated lateral leg, they nevertheless extend more towards the central magnet pole 10 than the outer legs. Like air gaps are thus defined between poles 10-11 and between poles 10-12, respectively.

The bottom 8 faces away from the separating foil 2 and rests with the interposition of seals 9', against a block 14 which is provided with passages 13. The block is also provided with a centrally located port 15 which connects with one of the passages 13. Valve boreholes 16 and 17 pass through the bottom 8 and are axially aligned with magnet poles 11 and 12 respectively. Valve boreholes 16 and 17 terminate at valve seats 18 and 19 respectively, extending into the interior of the valve housing 3. The seats are of plastic and integrally formed with the valve housing 3. The valve boreholes 16 and 17 are symmetrically located with respect to the port 15, and their longitudinal axis is perpendicular to the separating foil 2.

As shown in FIG. 1, a pivotally mounted armature assembly includes spaced upwardly extending arm sections 20' of two identically developed strip-shaped pole shoe bodies 20, which are mirror images of each other and are connected below the central magnet pole 10. These arm sections 20' are poised within the above-mentioned air gaps, and therefore, together with the two outer magnet poles 11 and 12, these arm sections 20' establish four air gaps. The shoe bodies 20 are of readily magnetizable material and they abut the larger opposed side surfaces of a permanent magnet 21 of rectangular cross section, the magnet 21 being disposed at a sufficient offset both from the central magnet pole 10 and from the bottom 8. The armature assembly is thus of U-shaped cross section and consists of the two pole shoe bodies 20 and the permanent magnet 21. Permanent magnet 21 is provided with a covering 22 of plastic, and outwardly extending mounts or holders 23 are external features of covering 22, projecting in diametrically opposite directions. A valve member 24 arranged in each of the holders, aligned for seating engagement with each of the respective valve seats 18 and 19.

The armature assembly formed of the permanent magnet 21 and the pole shoe bodies 20 as well as the covering with the holders 23 is mounted in the valve housing for swinging about a pivot axis which lies in the parting plane of the valve housing and the plane of symmetry of the magnet head 1 and which is also parallel to the plane defined by the separating foil 2. That is to say, the axis of pivotal rotation is perpendicular to the viewing plane, so that the arm sections 20' of the armature are capable of right/left displacement. For this purpose, on the two ends of the permanent magnet 21 close to the edge adjacent the bottom 8, there are provided two mounting pins which are aligned with each other and rest in bearings (not shown, but indicated by the legend "PIVOT") of the valve housing. The mounting of this assembly could, however, also be effected differently, it being of advantage that the load on the bearing be slight in view of the slight mass of the armature assembly and the small tensile forces which the magnet systems exert radially on the bearing. The armature formed by the two arm sections 20' can therefore be swung together with the other parts of the assembly clockwise or counterclockwise, as seen in FIG. 1, from the central position shown there, the size of the operating air gaps and the dimensions of the arm sections 20' being so selected that in at each limit of pivotal displacement one arm section 20' rests against the central magnet pole 10 while the other abuts one of the outer magnet poles 11 or 12.

In the circumstance of a magnetic flux in one direction or the other which is produced by means of the exciter coils 5 and can be brought about by a pulse-like signal, the arm sections 20' detach themselves from the magnet poles. Depending upon whether the solenoid valve has a monostable, bistable or tristable characteristic, the armature assembly will respond either by moving back into the limiting end position, previously assumed, or by shifting into the other limiting end position, or it will remain in the central position shown in FIG. 1. From the central position, the armature can be brought into one or the other limiting end position by a pulse-like excitation of the exciter coils 5.

In the illustrative embodiment shown, each valve member 24 is preloaded by a compression coil spring 25 urging the same in the direction of engagement with its valve seat. At its upper ends, each coil spring 25 locates in a borehole 26, in one of the outer magnet poles (11 or 12), in proper alignment with its associated valve member 24. Since in the embodiment shown these boreholes 26 are developed as continuous boreholes, the springs 25 abut the separating foil 2. The mounting of valve 24 in holders 23 is so constructed that (a) in the central position of the armature both valve boreholes 16 and 17 are closed (b) one of them remains closed (while the other is opened) upon a pivoted displacement of the armature into either or its the limiting end position.

In order to be able to adjust the operating air gaps in a simple manner, each of the two outer magnet poles 11 and 12 is provided with a threaded bore which is aligned with the end sections 20', within each of which bores there is an adjustment screw 27 of readily magnetizable material. The protrusion of the adjustment screws 27 beyond the surface of the magnet pole 11 or 12 adjoining the working air gap determines the reduction in the effective size of the air gap such protrusion being illustratively shown in FIG. 1, for an adjusted reduction of the air gap between pole 11 and the adjacent arm section 20' of the armature.

In the same manner as the adjustment screws 27, spring systems could be arranged in boreholes of the outer magnet poles 11 and 12 and the rest directly or indirectly against the end sections 20', possibly only in the end positions of the armature.

Figure 2:
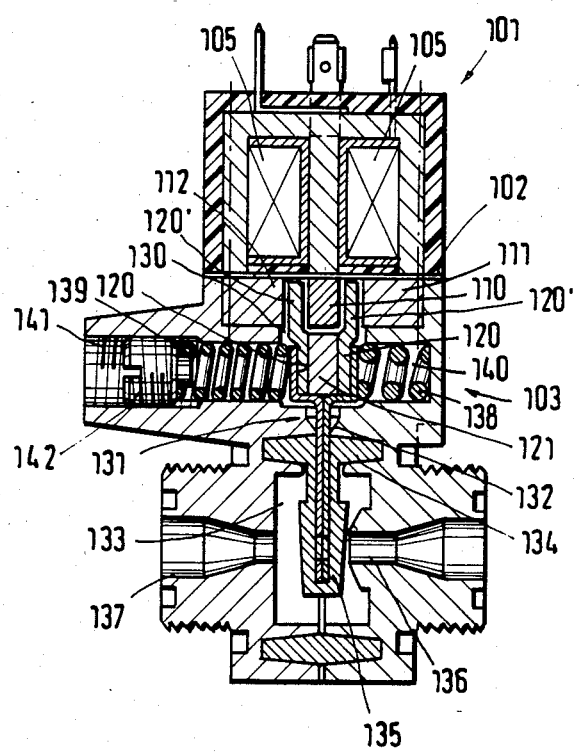
FIG. 2 is a longitudinal section through a second embodiment.

The embodiment shown in FIG. 2 has a magnet head 101 which differs from the magnet head 1 of the first embodiment merely by the fact that only a single exciter coil 105 is provided, because solenoid valve has a monostable behavior. Of course, if so desired, the electromagnet can also be provided with two exciter coils. For further details with regard to the magnet head 101, reference is had to what has been stated with respect to the first embodiment, the discussion of which is incorporated herein by reference.

The valve housing 103, which is divided in the plane of symmetry of the magnet head 101, rests against the separating foil 102 and is screwed to the magnet head 101. On the side of housing 103 adjoining the separating foil 102 there is provided a recess 130 within which the central magnet pole 110 and the two outer magnet poles 111 and 112 are fixed in the same arrangement as in the first embodiment. Since no valve boreholes extend into the first recess 130, the two outer magnet poles 111 and 112 can rest on their side facing away from the separating foil 102 against supporting surfaces of the valve housing.

Within the first recess 130 there is an assembly which consists of a permanent magnet 121 and two pole shoe members 120, which assembly is developed like the corresponding assembly of the first embodiment and forms the armature with the free end sections 120' of the pole shoe members 120.

The permanent magnet 121 and the two pole shoe members 120 form a part of the first arm of a double-arm rocker lever 131 which is swingably mounted between two oppositely pointing knife edges, these knife edges 132 defining a lever swivel axis which lies in the parting plane of the valve housing 103 and parallel to the separating foil 102; that is, perpendicular to the viewing plane so that the armature rotates in the viewing plane. The knife edges 132 are formed by two wall parts which face each other and terminate at a distance from each other and form an intermediate wall between the first recess 130 and a second recess 133 into which the second arm of the double arm rocker lever 131 extends. Directly adjacent the knife edges 132, on the side facing the second recess 133, is a trapezoidal groove in each of the two wall parts which face each other. The grooves become wider towards the parting plane and surround the second recess (133) in annular form at a distance therefrom. These two grooves receive an annular sealing body 134 having the shape of a double trapezoid in cross section, which surrounds the double arm rocker lever 131 which extends into the second recess 133. Lever 131 is formed of two flat metal rails which lie against each other, is completely surrounded by a convering formed in a single piece with the sealing member 134 and which also forms a valve member 135. The latter is aligned with a valve bore 136 which extends into the second recess 133 in the center of a valve seat against which the valve closure piece 135 rests when the rocker lever is in one limiting end position. A second valve bore 137, which also extends into the second recess 133, is arranged coaxially to the valve bore 132 in the embodiment shown. The solenoid valve can therefore be installed in a section of linear line. By the surrounding of the parts of the double arm rocker lever extending into the second recess and the one-piece development of the covering with the sealing member 134 assurance is had that the fluid to be controlled cannot come into contact with the rocker lever and cannot pass between it and the sealing member into the first recess 130.

The two flat rails extend into the first recess 130 and there form a receiver of U-shaped cross section which is open toward the separating foil 102 and into which the section of the pole shoe members 120 (which abut the permanent magnet 121) is inserted, at least over a part of their length. In suitable manner, for instance by cementing, a firm connection is made between the receiver and the pole shoe members 120.

Against the outer sides of the receiver which are opposite each other in the direction of swing of the rocker lever there are prestressed coil springs 138 and 139 respectively whose longitudinal axes are aligned with each other, are arranged perpendicularly to the parting plane of the valve housing and thus, in the central position of the rocker lever 131. The springs are also perpendicular to the side cheeks of the receiver. The one coil spring 138 is arranged, with the exception of the end section resting against the receiver, in a blind borehole 140 of the valve housing. The coil spring 138 exerts a moment of rotation on the rocker lever 131, which moment presses the valve closure piece 135 against the mouth opening of the valve bore 136 and its valve seat. The other coil spring 139 lies, on the other hand, in a continuous borehole 141 in the valve housing which is aligned with the blind borehole 140. The end of the coil spring 139 pointing away from the rocker lever 131 rests against an adjustment screw 142 which is guided in a threaded section of the continuous borehole 141. By turning the adjustment screw 142, the initial tension of the coil spring 138 can be increased or decreased.

Of course, it would also be possible to arrange each of the two coil springs 138 and 139 in a separate blind borehole or in a separate borehole with an adjustment screw. Such a spring system could, of course, also be provided in the embodiment shown in FIG. 1. The boreholes for receiving the springs could be provided there in the outer magnet poles 11 and 12. Then, to be sure, the adjustment screws 27 would have to be arranged staggered in the longitudinal direction of the magnet poles. Such adjustment screws could also be provided in the embodiment shown in FIG. 2.

Although several embodiments of the inventive solenoid valve have been described with reference to the drawings, various modifications will be obvious to those with ordinary skill in the art. Such modifications, are within the spirit and scope of the instant invention, which is limited and defined only by the appended claims.

I claim:

1. A solenoid valve comprising a valve body defining a chamber with two ports and at least one valve seat within said chamber for controlling port-to-port flow via said chamber, an armature mounted for pivotal displacement with respect to said body, a valve member in said chamber and connected to said armature for coaction with said seat in accordance with pivoted displacement of said armature, said armature including a permanent magnet with two spaced arms defining opposed poles across an air gap therebetween, and an electromagnet mounted to said body and outside said chamber, said electromagnet comprising a three-leg core positioned to receive one armature arm between the center core leg and one of the outer core legs and to receive the other armature arm between the center core leg and the other of the outer core legs, the positioning and proportioning of core legs and armature arms being such that four air gaps are established between the respective adjacent faces of said core legs and said armature arms, and an excitation winding coupled to said center leg.

2. A solenoid valve according to claim 1, wherein said armature is a U-shaped assembly of two like arms of magnet-flux-conducting material assembled to oppositely polarized faces of a permanent magnet of rectangular section.

3. A solenoid valve according to claim 1, wherein said three-leg core is of E or M configuration.

4. A solenoid valve according to claim 1, wherein a rocker lever is the means of valve member connection to the armature and is also the means of pivotal mounting of the armature.

5. A solenoid valve according to claim 1, characterized by the fact that at least in one of the two outer core legs of the electromagnet there is provided a continuous threaded borehole which extends into the adjoining operating air gap and in which an adjustment screw of magnetizable material is arranged.

6. A solenoid valve according to claim 1, characterized by the fact that a pair of oppositely directed springs act in the direction of pivotal displaceability of the armature.

7. A solenoid valve according to claim 6, characterized by the fact that the springs are two coil springs each of which has one end referenced to said body and its outer end poised for action to pivot said armature.

8. A solenoid valve according to claim 7, characterized by the fact that a spring-tension adjustment screw is associated with at least one of said springs.

9. A solenoid valve according to claim 1, in which said chamber has a valve seat and a valve member at each of said ports, and in which said armature is part of an assembly which includes valve-member supports on opposite sides of the pivotal axis.

10. A solenoid valve according to claim 9, characterized by the fact that said valve-member supports are developed on a plastic member which surrounds said permanent magnet.

11. A solenoid valve according to claim 9, characterized by the fact that said valve members are guided by said supports and are spring-urged toward valve-seating.

12. A solenoid valve according to claim 1, characterized by the fact that said armature is external to said chamber and is part of an assembly which at least in part forms a first arm of a double-armed rocker lever, whose second arm extends into said chamber, said second arm being sealed to said body at entrance to said chamber, and said second arm carrying said valve member for throttling coaction with said valve seat.

13. A solenoid valve according to claim 12, in which said valve member is a part of a plastic member surrounding the second arm.

14. A solenoid valve according to claim 13, characterized by the fact that said plastic member is integrally formed to additionally effect the sealed engagement to said body.

15. A solenoid valve according to claim 12, characterized by the fact that the rocker lever is developed as a resilient leaf spring or bar spring.

16. A solenoid valve comprising a generally cup-shaped body open at one end and defining a chamber with two ports and at least one valve seat and a coacting valve member within said chamber for controlling port-to-port flow via said chamber, a membrane spanning and providing sealed closure of the open end of said body, and electromagnetic means for actuating said valve member; said electromagnetic means comprising a core of magnetic-flux-conducting material having three spaced legs interconnected at one end and terminating in a single geometrical plane at their other end, an electrical winding coupled to the center core leg, said core and winding being assembled to and externally of said valve body with the said other ends of the core legs in face-to-face adjacency with one side of said membrane, three spaced core-extension blocks of magnetic-flux-conducting material mounted to and within said body in face-to-face adjacency with the other side of said membrane and in lapping register with the respective core legs whereby the core circuit of said electromagnetic means is extended into said body and is characterized by two spaced gaps between blocks within said body, a permanently magnetized armature pivotally suspended within said body and having spaced oppositely polarized arms within the respective gaps, and an actuating connection from said armature to said valve member.

17. A solenoid valve comprising a valve body defining a chamber with two ports and at least one valve seat within said chamber for controlling port-to-port flow via said chamber, a valve member movably mounted in said body for coaction with said seat, an armature external to said chamber and carried for movement with said valve member, said armature including a permanent magnet with two spaced arms defining opposed poles across an air gap therebetween, and an electromagnet mounted to said body and outside said chamber, said electromagnet comprising a three-leg core positioned to receive one armature arm between the center core leg and one of the outer core legs and to receive the other armature arm between the center core leg and the other of the outer core legs, the positioning and proportioning of core legs and armature arms being such that four air gaps are established between the respective adjacent faces of said core legs and said armature arms, and an excitation winding coupled to said center leg.

* * * * *